United States Patent [19]

Machi et al.

[11] 4,379,200

[45] Apr. 5, 1983

[54] NOVEL METHOD OF PRODUCING ION EXCHANGE MEMBRANE

[75] Inventors: Sueo Machi, Takasaki; Isao Ishigaki, Maebashi; Takanobu Sugo, Gunma, all of Japan

[73] Assignee: Japan Atomic Energy Research Institute, Tokyo, Japan

[21] Appl. No.: 302,054

[22] Filed: Sep. 14, 1981

Related U.S. Application Data

[63] Continuation of Ser. No. 118,104, Feb. 4, 1980, abandoned.

[30] Foreign Application Priority Data

Feb. 5, 1979 [JP] Japan ................................. 54-11992

[51] Int. Cl.$^3$ ............................................. B05D 3/06
[52] U.S. Cl. ..................................... 428/337; 427/35
[58] Field of Search ................... 427/35, 44, 36, 54.1; 204/159.11, 159.15, 159.2; 428/220, 337

[56] References Cited

U.S. PATENT DOCUMENTS

| | | | |
|---|---|---|---|
| 3,088,791 | 5/1963 | Cline et al. | 427/44 |
| 3,188,165 | 6/1965 | Magat et al. | 427/35 |
| 3,322,661 | 5/1967 | Yoshikawa et al. | 204/159.17 |
| 3,427,206 | 2/1969 | Scardaville et al. | 427/44 |
| 3,955,014 | 5/1976 | Mostev et al. | 427/54.1 |

*Primary Examiner*—John H. Newsome
*Attorney, Agent, or Firm*—Browdy and Neimark

[57] ABSTRACT

A method of producing an ion exchange membrane comprising irradiating a polyethylene film not more than 150 μm thick with ionizing radiation for a total dose of 1–30 Mrads in vacuum or in an inert gas, bringing the irradiated film into contact with a 15 to 50 wt % aqueous solution of acrylic acid and/or methacrylic acid at 15° to 50° C. to have acrylic acid and/or methacrylic acid graft copolymerized onto polyethylene, followed by treatment of the graft copolymer with a 2 to 10 wt % aqueous solution of potassium hydroxide.

5 Claims, No Drawings

NOVEL METHOD OF PRODUCING ION EXCHANGE MEMBRANE

This is a continuation, of application Ser. No. 118,104 filed Feb. 4, 1980 now abandoned.

BACKGROUND OF THE INVENTION

1. Field of the Invention

This invention relates to a method of producing an ion exchange membrane having grafted branches of acrylic acid and/or methacrylic acid on a polyethylene film. The invention is characterized by a method of producing an ion exchange membrane having low electrical resistance which comprises the steps of irradiating a polyethylene film not more than 150 μm thick with ionizing radiation to give a total dose of 1–30 Mrads in vacuum or in an inert gas, reacting the film with a 15 to 50 wt% aqueous solution of acrylic acid and/or methacrylic acid at 15° to 50° C. to prepare a graft copolymer, and treating the graft copolymer with a 20 to 10 wt% aqueous solution of potassium hydroxide.

2. Description of the Prior Art

Ion exchange membranes are important as diaphragms indispensable to electrolysis and electrodialysis. Membranes made of sulfonated styrene-divinyl benzene or styrenebutadiene copolymer do not have adequate mechanical strength or chemical resistance and so they find use only in limited applications.

A method is known of producing an ion exchange membrane from a polyethylene base which is chemically very stable and is highly chemical resistant and which has incorporated therein electrolytic groups by graft copolymerizing acrylic acid and/or methacrylic acid onto polyethylene. But an ion exchange membrane produced by this method is not adequately low in electrical resistance primarily because polyethylene is so hydrophobic that electrolytic groups are not uniformly introduced throughout its thickness during manufacture using a conventional technique.

Therefore, the inventors of this invention made extensive and thorough studies on the reaction of graft copolymerizing acrylic acid and/or methacrylic acid onto polyethylene using ionizing radiation having high penetrating power, and have now sucessfully prepared an ion exchange membrane having very small electrical resistance by combining limited conditions selected for many steps.

DETAILED DESCRIPTION OF THE INVENTION

This invention is capable of providing an ion exchange membrane from polyethylene which can be easily processed into a film. The membrane can be controlled to have a thickness not more than 150 μm, it has high chemical stability and mechanical strength, and has small electrical resistance. The invention uses a pre-irradiation method wherein irradiation of a polyethylene film with ionizing radiation preceeds the reaction for graft copolymerizing acrylic acid and/or methacrylic acid onto the polyethylene. Therefore, the intended irradiation can be achieved easily with the particular advantages in that unnecessary consumption of acrylic acid and methacrylic acid due to their homopolymerization can be suppressed easily and that the thickness of the polyethylene film which is not more than 150 μm permits the use of lowenergy electron beams that are easy to handle.

The method of this invention can start with either low-density or high-density polyethylene. With low-density polyethylene, graft copolymerization proceeds at high initial reaction rate but the final degree of grafting is slightly less than with high-density polyethylene. The polyethylene film of either type should have a thickness not more than 150 μm. If it exceeds 150 μm, the graft distribution is not uniform throughout the thickness of the film and it becomes relatively difficult to provide an ion exchange membrane having a specific resistance of 50 ohms·cm (Ω·cm) or lower.

The polyethylene film is irradiated with 1 to 30 Mrads of ionizing radiation. A radiation dose lower than 1 Mrad results in low rate of graft copolymerization and final degree of grafting, whereas a dose higher than 30 Mrads does not provide an appreciable increase from the final degree of grafting obtained with a dose of 30 Mrads. Irradiation of ionizing radiation is performed in vacuum or in an inert gas such as nitrogen. If it is effected in air, radicals formed on the surface layer of the polyethylene film by irradiation react with oxygen to form peroxide which is heated to initiate grafting, whereas in the center layer of the film, radicals trapped in the crystal initiate grafting. But since the grafting initiated by the peroxide has different temperature dependency than that initiated by the trapped radicals, grafting does not proceed uniformly throughout the thickness of the film, and as a result, a membrane having a uniform graft distribution is not provided.

The polyethylene film is irradiated with ionizing radiation suitably at a temperature lower than 40° C. to prevent deactivation of the radicals formed by irradiation.

The concentration of acrylic acid and/or methacrylic acid used as an aqueous solution for grafting is preferably in the range of from 15 to 50 wt%. The grafting of acrylic acid and/or methacrylic acid starts from the surface of the polyethylene film; the part onto which the grafted chains of acrylic acid and/or methacrylic acid has been given becomes hydrophilic and swells by absorbing the aqueous monomer solution. As a result, the monomer diffuses into the film, causing the grafting reaction to proceed toward the center layer of the film. Accordingly, the higher the monomer concentration, the faster the rate of grafting, but a monomer concentration greater than 50 wt% does not provide a corresponding advantage because it decreases the degree of swelling of the film, thus failing to achieve adequate diffusion of the monomer into the film. A monomer concentration less than 15 wt% is not advantageous either, because it results in low rate of graft reaction and poor productivity.

Oxygen dissolved in the aqueous monomer solution is deleterious to grafting, and it must be removed before grafting by either freeze-degassing the aqueous monomer solution in vacuum or by displacing oxygen with nitrogen and other inert gas which is bubbled through the solution.

Low graft copolymerization temperature results in low reaction rate whereas high graft copolymerization temperature achieves high reaction rate but then it often causes deactivation of radicals. Therefore, for the purposes of this invention, a temperature range of from 15° to 50° C. is selected. The reaction time varies with the reaction temperature and it can be suitably selected depending upon the intended degree of grafting. To prevent homopolymerization of the monomer during grafting or upon storage of the aqueous monomer solution, a suitable amount of ferrous salt or cupric salt may be added to the aqueous monomer solution. Such homopolymerization inhibitor may be preferably added in an amount of from 0.01 to 25 wt% of the aqueous monomer solution.

The polyethylene film onto which acrylic acid and/or methacrylic acid is grafted is extracted with water to remove the unreacted monomer and homopolymer, and then treated with an aqueous solution of potassium hydroxide. The treatment with potassium hydroxide is preferably carried out at a temperature between room temperature and 90° C. for a period of 5 to 120 minutes. The above described procedure gives an ion exchange membrane wherein the degree of grafting is at least 60%, and which exhibits stable performance with an electrical resistance being invariably held at less than 50 ohms·cm.

This invention is now described in greater detail by reference to the following examples and comparative examples which are given here for illustrative purposes only and are by no means intended to limit the scope of this invention.

EXAMPLE 1

A high-density polyethylene film 20 μm thick sealed in a polyethylene bag in a nitrogen atmosphere was irradiated with 20 Mrads of electron beams from a resonant transformer accelerator (2 MeV, 1 mA). The thus irradiated polyethylene film was placed in a glass ampule and held in contact with an aqueous monomer solution containing 50 wt% of acrylic acid and 0.25 wt% of Mohr's salt at 25° C. for 5 hours at a reduced pressure of $10^{-4}$ mmHg. The aqueous monomer solution had been stripped of dissolved oxygen by bubbling nitrogen gas through it. After the reaction, the polyethylene film was removed from the bag, washed and extracted with water to remove the unreacted monomer and homopolymer, and dried. The degree of grafting of the ion exchange membrane thus prepared was 125%. The membrane was then treated with a 2.5% aqueous solution of potassium hydroxide at 90° C. for 120 minutes. The resulting membrane had a specific resistance of 16 ohms·cm as measured in 40% potassium hydroxide.

When the above procedure was repeated except that the grafting temperature was 90° C., much homopolymer was detected in the grafting reaction system which therefore looked like a gel. The glass ampule was broken to take out the reaction mixture which was then subjected to repeated washing and extraction with water to obtain an ion exchange membrane whose degree of grafting was 40%. After treatment with potassium hydroxide in the manner described above, the membrane had a specific resistance of 100 ohms·cm.

EXAMPLES 2 to 6 AND COMPARATIVE EXAMPLES 1 to 4

The procedure of Example 1 was repeated by varying the type and thickness of polyethylene film, radiation dose and atmosphere, type and concentration of monomer, additive, grafting temperature and time, concentration of potassium hydroxide, temperature for treatment with potassium hydroxide and its period. The electrical resistance of each of the ion exchange membranes produced was measured and recorded in Table 1 below.

TABLE 1

| Factor Run No. | Polyethylene Type | Thickness (μm) | Irradiation Atmosphere | Radiation dose (Mrad) | Aqueous monomer solution Type of monomer | conct. (wt %) | Additive (wt %) | Graft reaction Temp. (°C.) | Time (hr) | rate of grafting (%) | Treatment with potassium hydroxide conct. of KOH (wt %) | temp. (°C.) | time (min) | Electrical resistance Specific resistance (Ω · cm) |
|---|---|---|---|---|---|---|---|---|---|---|---|---|---|---|
| Ex. 2 | High-density | 20 | N$_2$ | 20 | acrylic acid | 50 | Mohr's salt 0.25 | 25 | 5 | 110 | 2.5 | 95 | 120 | 20 |
| 3 | Low-density | 20 | N$_2$ | 20 | acrylic acid | 50 | Mohr's salt 0.25 | 25 | 4 | 100 | 2.5 | 60 | 60 | 15 |
| 4 | High-density | 100 | N$_2$ | 10 | acrylic acid | 30 | Mohr's salt 0.25 | 45 | 2 | 80 | 10 | 25 | 120 | 20 |
| 5 | Low-density | 100 | N$_2$ | 25 | Methacrylic acid | 18 | Mohr's salt 0.25 | 25 | 5 | 85 | 2.5 | 90 | 120 | 18 |
| 6 | High-density | 150 | N$_2$ | 30 | acrylic acid | 50 | Mohr's salt 0.10 | 30 | 5 | 95 | 5 | 90 | 10 | 13 |
| Com. Ex. 1 | High-density | 200 | N$_2$ | 30 | acrylic acid | 50 | Mohr's salt 0.25 | 30 | 5 | 40 | 2.5 | 90 | 120 | 200 |
| 2 | High-density | 100 | Air | 20 | acrylic acid | 50 | Mohr's salt 0.25 | 30 | 5 | 80 | 2.5 | 90 | 120 | 60 |
| 3 | Low-density | 20 | N$_2$ | 5 | acrylic acid | 50 | Mohr's salt 0.25 | 25 | 5 | 60 | 40 | 25 | 120 | 60 |
| 4 | Low-density | 20 | N$_2$ | 30 | acrylic acid | 10 | Mohr's salt 0.25 | 25 | 5 | 50 | 2.5 | 90 | 120 | 80 |

What is claimed is:

1. A method of producing an ion exchange membrane having an electrical resistance of 50Ω cm or lower and a uniform graft distribution comprising
   irradiating a polyethylene film not more than 150 μm thick with ionizing radiation for a total dose of 1-30 Mrads in vacuum or in an inert gas, then contacting the irradiated film with a 15 to 50 wt% aqueous solution of acrylic acid and/or methacrylic acid, substantially free of oxygen and which contains a homopolymerization inhibitor of a ferrous salt or a cupric salt to graft acrylic acid and/or methacrylic acid onto the polyethylene film, for a time sufficient to provide a degree of grafting of at least 60%, and then treating the grafted film with a 2 to 10 wt% aqueous solution of potassium hydroxide at a temperature of room temperature to 90° C. for 5–120 minutes.

2. The method as defined in claim 1 wherein said irradiation is carried out in a nitrogen atmosphere.

3. The method as defined in claim 1 wherein said inhibitor is added in an amount within the range of from 0.01 to 25% by weight based on the amount of the aqueous solution of monomer.

4. A product of high chemical stability and mechanical strength obtained by the method of claim 1 having a thickness not more than 150 μm, a degree of grafting of at least 60% with a uniform graft distribution throughout its thickness, and an electrical resistance not greater than 50 ohms cm.

5. A method as defined in claim 1 wherein said aqueous solution is made substantially free of oxygen by freeze-degassing the aqueous monomer solution in vacuum or by displacing oxygen with nitrogen or other inert gas by bubbling said nitrogen or other inert gas through the solution.

* * * * *